US009881052B2

(12) United States Patent
Dickie (10) Patent No.: US 9,881,052 B2
(45) Date of Patent: *Jan. 30, 2018

(54) LIMITING SCANS OF LOOSELY ORDERED AND/OR GROUPED RELATIONS IN A DATABASE

(71) Applicant: International Business Machines Corporation, Armonk, NY (US)

(72) Inventor: Garth A. Dickie, Framingham, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/699,352

(22) Filed: Apr. 29, 2015

(65) Prior Publication Data
US 2016/0098451 A1    Apr. 7, 2016

Related U.S. Application Data

(63) Continuation of application No. 14/507,028, filed on Oct. 6, 2014, now Pat. No. 9,747,331.

(51) Int. Cl.
G06F 17/30 (2006.01)

(52) U.S. Cl.
CPC .. G06F 17/30389 (2013.01); G06F 17/30339 (2013.01); G06F 17/30466 (2013.01); G06F 17/30539 (2013.01); G06F 17/30864 (2013.01)

(58) Field of Classification Search
CPC ................................................. G06F 17/30339
See application file for complete search history.

(56) References Cited

U.S. PATENT DOCUMENTS 6,760,718 B2    7/2004   Tamura
6,845,375 B1    1/2005   Sinclair
(Continued)

OTHER PUBLICATIONS

Harizopoulos et al., "Performance tradeoffs in read-optimized databases", In Proceedings of the 32nd international conference on Very large data bases (VLDB '06), Umeshwar Dayal, Khu-Yong Whang, David Lomet, Gustavo Alonso, Guy Lohman, Martin Kersten, Sang K. Cha, and Young-Kuk Kim (Eds.), 2006, VLDB Endowment 487-498.

(Continued)

Primary Examiner — Mohammad S Rostami
(74) Attorney, Agent, or Firm — Erik K. Johnson; Edell, Shapiro, & Finnan, LLC (57) ABSTRACT

Data within a database object are accessed based on a query with a predicate including a plurality of conditional expressions. Elements of the database object are stored among a plurality of different storage regions along with range values for element values within each storage region. Each conditional expression of the query predicate is applied to the range values for each storage region to produce evaluation results of that conditional expression for each storage region. The evaluation result of each conditional expression for a corresponding storage region is combined to produce aggregated results for each of the storage regions, where the aggregated result for a corresponding storage region indicates results of a tri-state evaluation (e.g., true/false or unknown) of the conditional expressions for that storage region. One or more corresponding individual storage regions are scanned based on the aggregated results for those storage regions when the tri-state evaluation is unknown.

7 Claims, 5 Drawing Sheets

(56) References Cited

U.S. PATENT DOCUMENTS

| | | |
|---|---|---|
| 6,947,934 B1 | 9/2005 | Chen et al. |
| 6,973,452 B2 | 12/2005 | Metzger et al. |
| 8,108,400 B2 | 1/2012 | Graefe |
| 8,521,748 B2 | 8/2013 | Slezak et al. |
| 8,566,909 B2 | 8/2013 | Yalamanchi |
| 2009/0019029 A1 | 1/2009 | Tommaney et al. |
| 2009/0070300 A1 | 3/2009 | Bartels et al. |
| 2011/0040733 A1* | 2/2011 | Sercinoglu ............ G06Q 30/02 707/688 |
| 2012/0011127 A1 | 1/2012 | Kim |
| 2012/0054225 A1 | 3/2012 | Marwah et al. |
| 2012/0095987 A1* | 4/2012 | Cheng ............... G06F 17/30442 707/713 |
| 2015/0032684 A1* | 1/2015 | Gupta ............... G06F 17/30575 707/600 |
| 2015/0095299 A1 | 4/2015 | Dickie et al. |
| 2015/0095379 A1 | 4/2015 | Dickie et al. |
| 2015/0286682 A1* | 10/2015 | Ziauddin .......... G06F 17/30486 707/718 |
| 2015/0326675 A1* | 11/2015 | Kini ....................... H04L 67/16 709/224 |
| 2015/0347492 A1 | 12/2015 | Dickie |
| 2016/0314168 A1 | 10/2016 | Dickie et al. |

OTHER PUBLICATIONS

List of IBM Patents or Patent Applications Treated as Related, Apr. 29, 2015.

\* cited by examiner

LIMITING SCANS OF LOOSELY ORDERED AND/OR GROUPED RELATIONS IN A DATABASE

CROSS-REFERENCE TO RELATED APPLICATIONS

This application is a continuation of U.S. patent application Ser. No. 14/507,028, entitled "LIMITING SCANS OF LOOSELY ORDERED AND/OR GROUPED RELATIONS IN A DATABASE" and filed Oct. 6, 2014, the disclosure of which is incorporated herein by reference in its entirety.

BACKGROUND

Present invention embodiments relate to database query evaluation, and more specifically, to limiting scans of loosely ordered data and/or grouped relations based on query predicate evaluation.

Searching for information using a query may result in a search of a large database table when an evaluation of the query indicates that the large database table should be scanned. In such a situation, it may be beneficial to eliminate rows (e.g., individual data records) in the large database table from consideration early in the scanning sequence before an unnecessarily large processing overhead has been incurred. Some database management systems maintain, metadata about each storage region in the form of range values or range maps that define minimum and maximum ranges in a given storage region in order to filter storage regions before actually reading and searching the stored data. For example, if a storage region is known to contain records with column values between 100 and 200 (e.g., as stored in the range map metadata), then when a query with range values outside of that known range (e.g., a query with a value of 500) is evaluated, the evaluation can eliminate that storage region.

In a hybrid column store, column data for data records (e.g., rows) in a storage region are not necessarily stored as a group of rows, but grouped into blocks of column data for permanent storage (i.e., as stored on a drive or disk). Example, hybrid column store techniques include, e.g., a Partition Attributes Across (PAX) data store, fractured mirrors, fine-grained hybrids, and variations thereof. Each hybrid column store technique has corresponding advantages and disadvantages. The above-mentioned hybrid column store approaches each have disadvantages with respect to input/output (I/O) volume, CPU and/or storage allocation. In a hybrid column store further benefits may be obtained by avoiding reading columns which should not be processed, beyond the benefits of avoiding reading entire regions of rows which should not be processed.

Furthermore, certain forms of data tend to be loosely ordered, e.g., when mapping highway traffic, data may be loosely ordered based on a time of day. That is, rush hour traffic may correlate to a morning rush hour or an evening rush hour in which traffic loads are much higher than the average traffic load. Similarly, data may exhibit a grouped relationship. For example, a given geographic region such as a county, city, country or state may have attributes such as a latitude and a longitude that may correlate to a given temperature or amount of rainfall at any given time of day or date. A hybrid column store may provide a level of data granularity that can avoid the reading of column data when the data are loosely ordered or relationally grouped, even when the values of those columns are ostensibly required for query evaluation, and when the region containing those values contains rows which must be processed.

SUMMARY

According to one embodiment of the present invention, data within a database object are accessed based on a query with a predicate including a plurality of conditional expressions, where an element of the database object is stored among a plurality of different storage regions with each storage region being associated with first and second range values indicating a value range for element values within that storage region. Each conditional expression of the query predicate is applied to at least one of the first and second range values for each of the storage regions to produce evaluation results of that conditional expression for the storage regions. The evaluation result of each conditional expression for a corresponding storage region is combined to produce aggregated results for each of the storage regions, where the aggregated result for a corresponding storage region indicates at least one of satisfaction of the conditional expressions for that storage region, failure to satisfy the conditional expressions for that storage region, and insufficient information to evaluate the conditional expressions for that storage region. Information is provided to evaluate one or more conditional expressions for a storage region in response to the aggregated result for that storage region indicating insufficient information, and one or more corresponding individual storage regions are scanned based on the aggregated results for those storage regions.

Embodiments of the present invention further include a method, a system and computer program product for limiting scans of loosely ordered or grouped relations in a database in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments optimize a search engine (e.g., a database search engine) by filtering a potential data set before it is read from storage (e.g., a disk or solid state drive (SSD)). Search efficiencies may be optimized by way of the techniques described herein by performing searches on smaller, more granular storage regions when those smaller regions will provide a target search result without searching larger storage regions. The storage region metadata can supply certain data with respect to their associated storage regions (e.g. minimum and maximum values for a given storage region). For example, if a storage region in a column store is known to contain records with column1 values between 100 and 200, then a query predicate (i.e., a database question) restricted to records with column1>500 will not read that region when evaluated, since it is known that values of 500 or more do not exist in that storage region (i.e., the query predicate or answer to the question is "false."). This situation is often referred to as a "false" condition since the Boolean predicate evaluation was equal to false. Other conditions may include "true" when the query predicate is true, or "don't know" when further predicate evaluation is warranted. The predicate conditions are evaluated to produce Boolean algebraic results, when available, that are sometimes referred to as a tri-state evaluation due to the three possible results (i.e., a Boolean true/false or a do not know condition).

In the above example, providing a more granular search may further reduce I/O. To start, a storage region with column1 ranging in values from 400 to 600, and a query predicate with a condition restricted to records with column1=500, are givens. Since the storage region includes column1 values ranging from 400 to 600 and the predicate requires values with column1=500, that storage region is read and every value in column1 is processed looking for those records with column1=500 (i.e., to filter out records when their column1 value is not equal to 500). Every record is read since the database management system (DBMS) does not know which records are of interest until they are scanned. This situation is referred to as a "don't know" condition.

In contrast, for a storage region with column1 metadata indicating column1 values range from 600 to 800, it may not be necessary to read that storage region if the query predicate is limited to the use of column1 to check column1>500, since all the values in that storage region are already known to be greater than 500. Under these conditions, that storage region need not be read or filtered, since the answer to the query predicate is known to be true for all values in that storage region. The techniques described herein describe details of how to make optimizations to avoid reading and/or scanning storage regions in a hybrid column store.

In a hybrid column store, reading some of the columns of interest in the query can be avoided (e.g., in some of these storage regions that are otherwise of interest) if those columns are used only for predicate evaluation and the predicate can be proven to be true for the entire region (e.g., as described above for the storage region with column1 values between 600 and 800, and a predicate condition of column1>500). In a brief example, with a predicate on several columns, the metadata about one column may be enough to answer the entire predicate for all columns, so none of the several columns need to be read or scanned. This optimization may not measurably improve I/O for a given record store because the columns of each record in some stores are stored together, and so are inexpensively accessed together as a unit, but might reduce decompression overhead in the record store, since it could identify columns which do not need to be decompressed. It should be noted that in a row based storage scheme, all rows in a storage region that satisfied a portion of the predicate would be read.

In many situations, each predicate term is evaluated as either false or do not know. If the Boolean combination of terms produces "false" then the region is not read, otherwise the region is read (as in the case of a true result). The query predicate evaluation process is extended according to the techniques described herein as an improved tri-state computation for false, true, or do not know conditions, with the further extension that the do not know condition carries with it a list of the columns needed in order to determine an answer to a given query.

As described above, some DBMSs maintain metadata about each region of table storage in order to filter table data (e.g., to filter out rows before actually reading the data stored in those rows). The metadata may contain value ranges or range maps that indicate minimum (min) and maximum (max) values for a given column (col) variable. Accordingly, the metadata may be of the form: col 1 {min value, max value}. For example, if a storage region is known to contain records with column values between 100 and 200 (i.e., col 1 {100, 200}), then a query restricted to records with column values greater than 500 will not read that storage region. However, if a query has a value from 100 to 200, including the values of 100 and 200, then that storage region may be read and searched. In this regard, a range map may identify upper and lower range values or bounds for data within a given storage region. The upper and lower bound may be conservative or inclusive of that bound.

In one example, for a given storage region, values that are less than or equal to the upper bound (e.g., a max) in storage region's metadata, and greater than or equal to the lower bound (e.g., a min), may be found in that storage region. In a hybrid column store, e.g., a PAX store, as many rows of data as can fit into a block are stored, but within a given block the data are stored as columns. Other hybrid column stores may provide variations of this model. The hybrid column storage scheme may provide certain compression and data cache efficiencies.

Thus, for every column of every table (or for a subset of the columns, but preferably all columns) and for each region of the table conservative bounds are maintained for the values in that column and in that storage region. By way of a couple of examples, bound conservatism may come from a lack of precision (e.g., for minimum and maximum string values longer than can be represented in metadata for that storage region), or from having rows removed from the storage region without updating the corresponding metadata. To further illustrate, reference is made to the various drawings.

Figure 1:
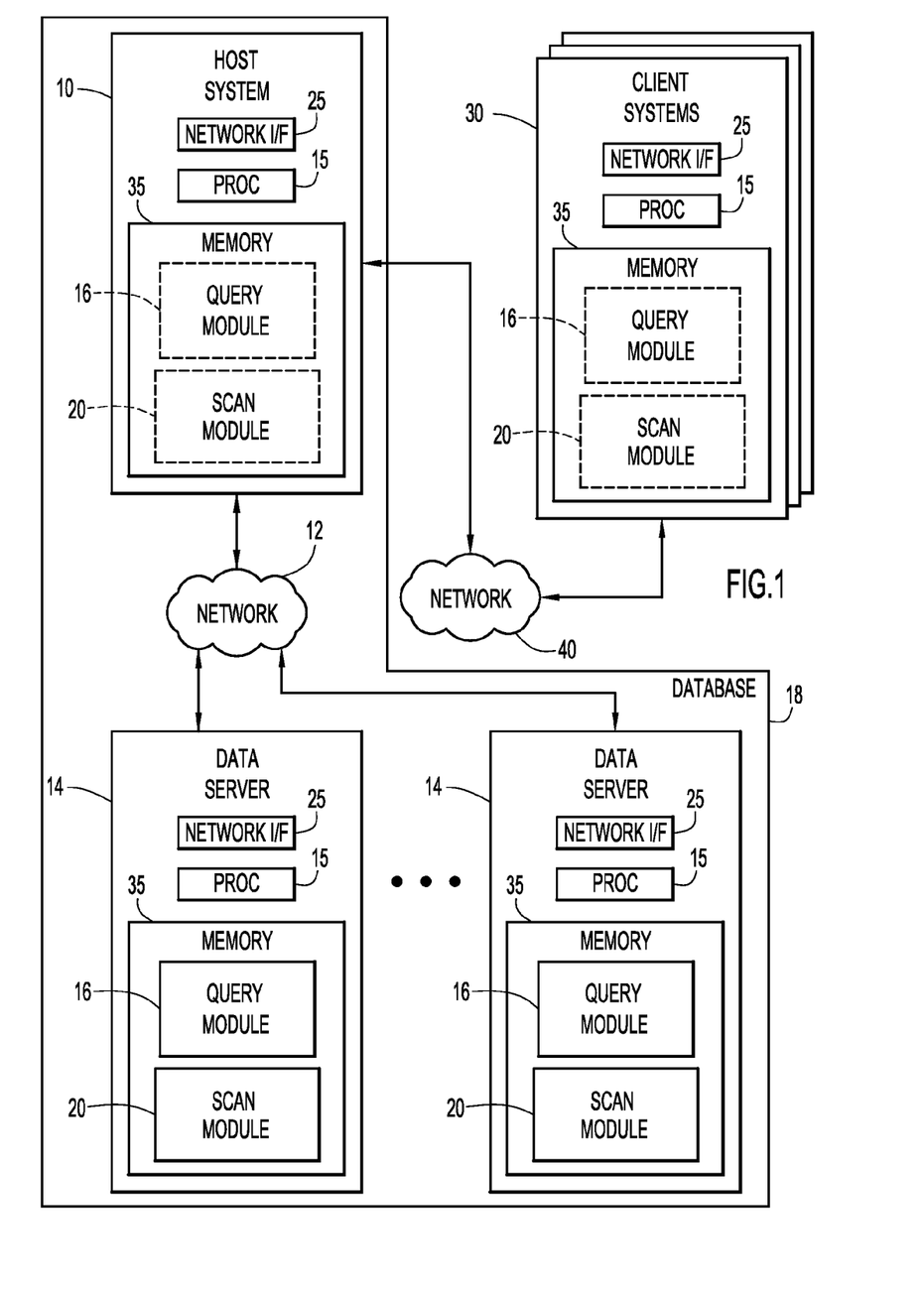
FIG. 1 is a diagrammatic illustration of an example computing environment for use with an embodiment of the present invention.

An example environment for use with present invention embodiments is illustrated in FIG. 1. Specifically, the environment includes one or more server or host systems 10, and one or more data servers 14. Host systems 10 and data servers 14 may be remote from each other and communicate over a network 12. The network may be implemented by any number of any suitable communications media (e.g., wide area network (WAN), local area network (LAN), Internet, intranet, etc.). Alternatively, host systems 10 and data servers 14 may be local to each other, and communicate via any appropriate local communication medium (e.g., local area network (LAN), data center network, hardwire, wireless link, intranet, etc.). One or more clients or end user systems 30 may be coupled to host systems 10 via a network (e.g., network 12 or network 40 depending on system configuration), data center network or data center edge switch.

Host systems 10, data servers 14, and client systems 30 may be implemented by any conventional or other computer systems preferably equipped with a display or monitor (not shown), a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, query module, scan module, browser/interface software, etc.). Data servers 14 may comprise compute and storage nodes or database engine blades (e.g., in a datacenter or server farm).

Data servers 14 may receive user/DBMS query information related to desired database information (e.g., data, documents, etc.) from host systems 10. In another example, the queries may be received by the data servers, either directly or indirectly (e.g., from a client system). The host systems 10 may include a query module 16 to evaluate queries (e.g., to generate a query plan and provide query results). The host systems 10 may also include a scan module 20 to perform scans of data portions identified by query module 16 (e.g., to evaluate unknown conditions or to provide specific data).

One or more components of the host systems 10, network 12 and data servers 14 may comprise a database management system (DBMS) or database system 18. The database system 18 may use any conventional or other database, or storage unit. Other DBMS components may be local to or remote from host systems 10 and data servers 14, and may communicate via any appropriate communication medium such as network 12 and/or network 40 (e.g., local area network (LAN), wide area network (WAN), Internet, hardwire, wireless link, intranet, etc.). Any clients, hosts, or data servers may present a graphical user interface (e.g., GUI, etc.) or other interface (e.g., command line prompts, menu screens, etc.) to solicit information from users pertaining to zone indices and maps, queries, and to provide results (e.g., query results, query efficiency or storage statistics, etc.). Further, these systems may provide reports to the user via the display or a printer, or may send the results or reports to another device/system for presenting to the user.

Alternatively, one or more hosts 10 or clients 30 may perform query processing when operating as a stand-alone unit (i.e., without using data servers 14). In a stand-alone mode of operation, the host/client stores or has access to the data (e.g., zone indices and/or maps, databases, etc.), and includes query module 16 to generate query results and scan module 20 to scan data identified by query module 16. The graphical user interface (e.g., GUI, etc.) or other interface (e.g., command line prompts, menu screens, etc.) solicits information from a corresponding user pertaining to queries, and may provide reports (e.g., query results, storage statistics, etc.).

Query module 16 and scan module 20 may include one or more modules or units to perform the various functions of present invention embodiments described below. The various modules (e.g., query module, scan module, etc.) may be implemented by any combination of any quantity of software and/or hardware modules or units, and may reside within memory 35 of the host systems, client systems and/or data servers for execution by processor 15. It should be understood, that the computing environment depicted in FIG. 1 provides example platforms (e.g., host systems 10, backend or data servers 14) for illustrating the techniques described herein. In this regard, data and database storage on one data server 14 may have no relationship with data and database storage on another data server 14.

Figure 2:
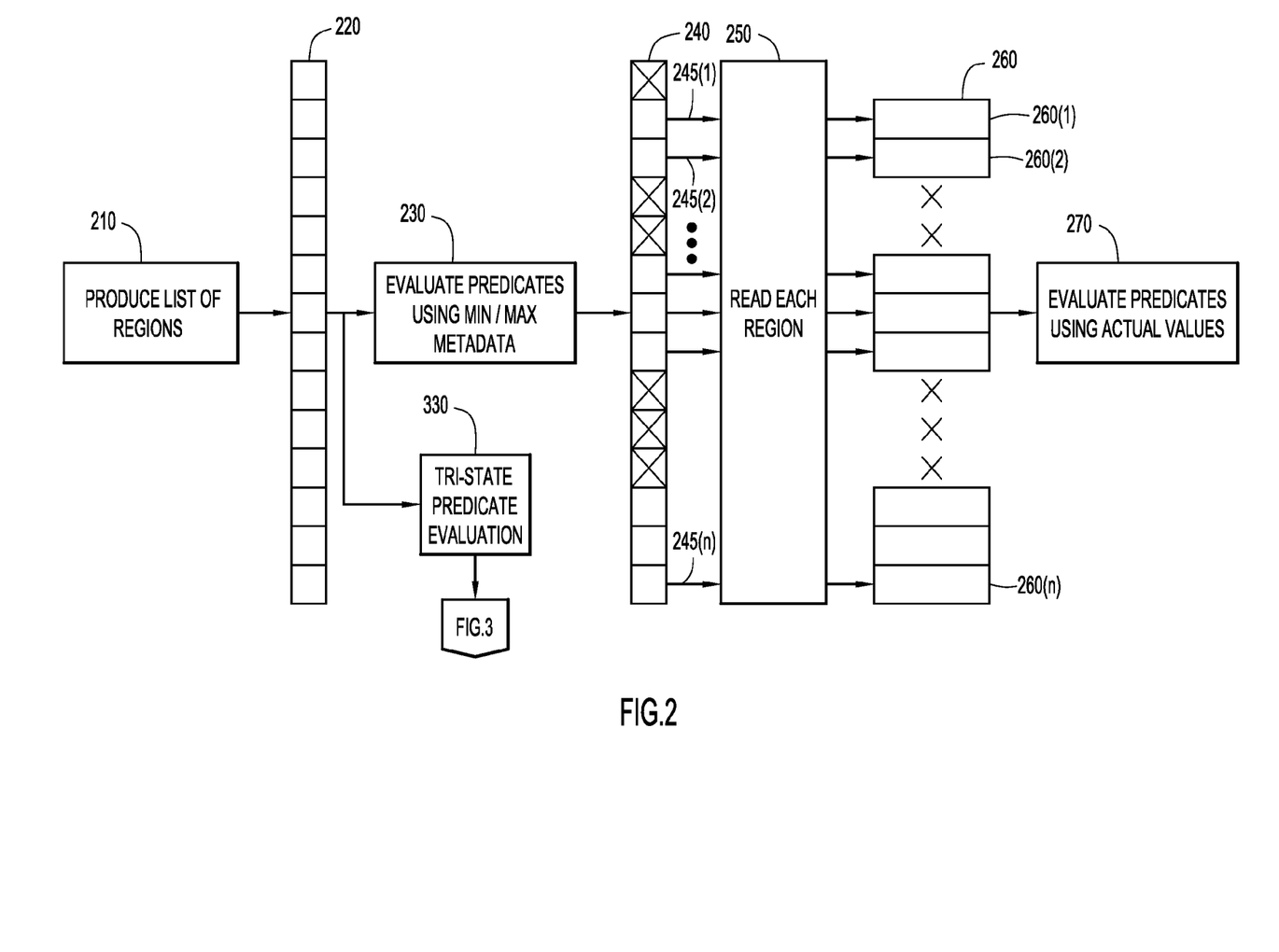
FIG. 2 is a flow diagram illustrating a manner in which query predicates are partially evaluated according to an embodiment of the present invention.

A manner in which query module 16 and scan module 20 (e.g., via a host system 10, client systems 30 and/or data servers 14) evaluate a query for a database according to an embodiment of the present invention is illustrated in FIG. 2. Specifically, a list of storage regions (e.g., for storing a database object such as a table) are produced at step 210. The list of storage regions may be produced based on the query and the data stores known to the DBMS. For example, a large database may comprise data for customers of an enterprise or corporation. Basic data for those customers may be stored in a relatively large database table that includes basic customer data (e.g., name, address, account number, etc.) or split across plural tables (relations) with keys that can link various data components. Table data may be stored as smaller sets or blocks of data for ease of retrieval. The list of storage regions is depicted as a vertical array at reference numeral 220.

In a typical query evaluation, the query predicate(s) may be traditionally evaluated using metadata (e.g., range maps with min/max range values) at step 230 in order to eliminate rows from consideration. Based on the predicate evaluations, certain storage regions may be eliminated from storage region list 220 and are depicted by an "X" in an updated storage region list 240 resulting from the query predicate evaluations at step 230. Those storage regions remaining after query predicate evaluations (i.e., those regions that have not been filtered out) are enumerated 245(1), 245(2), etc. Each storage region 245 is read at step 250. The storage regions that have been read are depicted as rectangular blocks and are enumerated by reference numerals 260(1), 260(2), etc., that correspond to the storage regions identified in the filtered list 245. Once storage regions 260 have been read (e.g., from a non-volatile mass storage device) into processing memory (e.g., volatile storage), the predicates can be evaluated using actual data at step 270.

Figure 3:
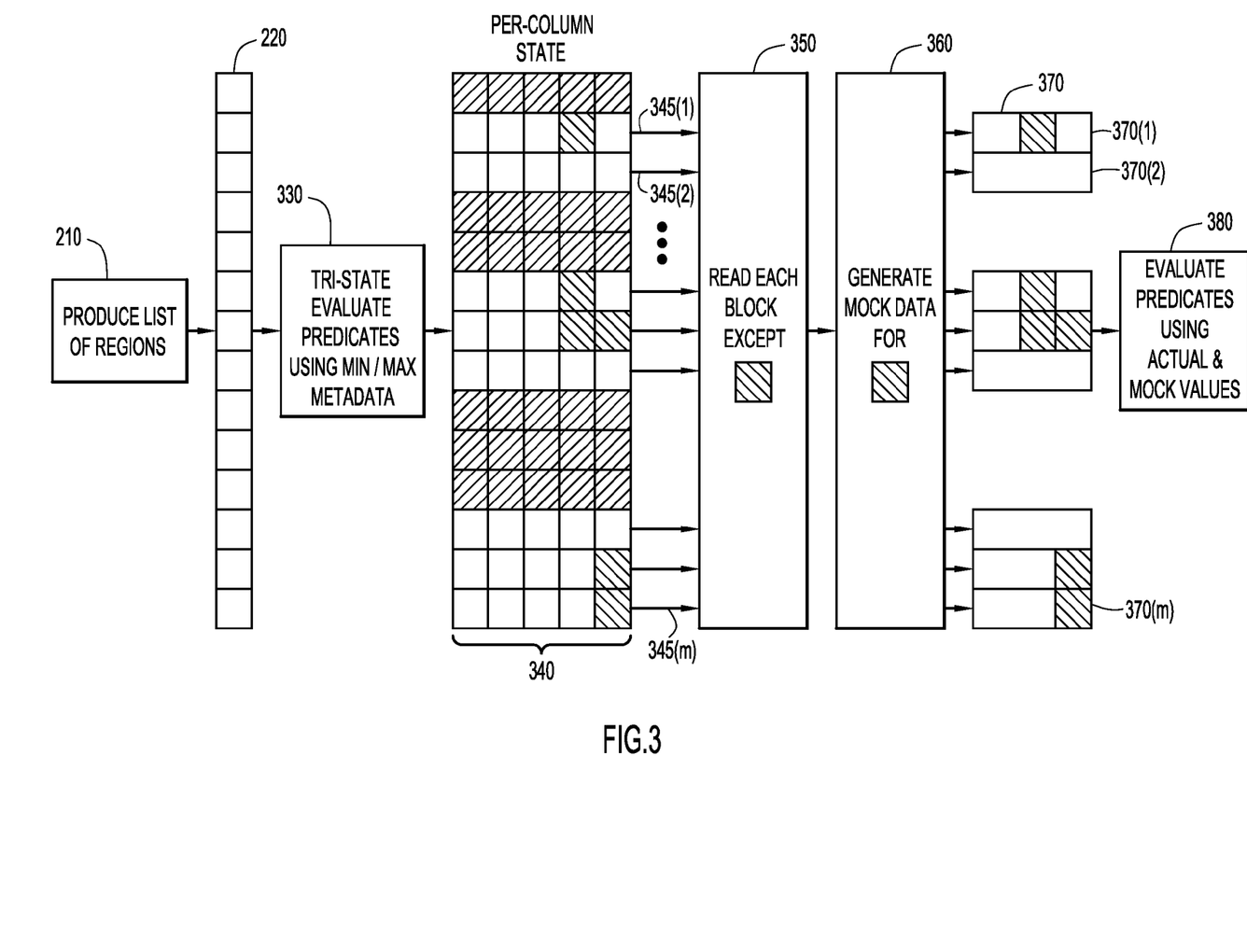
FIG. 3 is a flow diagram illustrating a manner in which query predicates are evaluated according to an embodiment of the present invention.

In contrast to predicate evaluation using min/max metadata (e.g., at step 230), present invention embodiments may perform a tri-state (three-state) evaluation at step 330. The predicate conditions are evaluated to produce one of three possible results (i.e., a Boolean true or false, or a do not know condition). A manner in which query module 16 and scan module 20 (e.g., via a host system 10, client systems 30 and/or data servers 14) evaluate a query for a database according to an embodiment of the present invention is illustrated in FIG. 3. Briefly, a list of storage regions are produced at step 210, and as in FIG. 2, the list of storage regions is depicted as a vertical array at reference numeral 220. The query predicates may be evaluated using metadata (e.g., range maps with min/max range values) using tri-state evaluation criteria at step 330, as detailed below.

In the example shown in FIG. 3, the tri-state evaluation 330 is depicted as an evaluation of each column in the list storage regions 220 to produce a per column result shown at reference numeral 340. In contrast to the storage region search result 240 shown in FIG. 2, the results at 340 depict results of the tri-state evaluation 330 on a per column basis for the whole set of columns derived from a given predicate within each storage region. In other words, once a potential storage region is identified, per column values within those potential storage regions are further identified and/or annotated to determine if a given column is to be read (e.g., a column "to be read" condition). It should be noted that some columns may be marked for reading since some of the column data may be needed for further processing to be performed after predicate evaluation.

Storage regions that are not to be read are shown at 340 as storage regions with left hashing throughout a given storage region has indicated by the diagonal lines beginning on the upper and right, and terminating on the lower left). Those storage regions that may be identified to be read are indicated by reference numerals 345(1), 345(2), etc. Of those storage regions 345 that are to be read, columns within a given storage region that do not have to be read are marked with right hashing (e.g., as indicated by the diagonal lines beginning on the upper and left, and terminating on the lower right). All other data within storage regions 345 that is to be read are depicted by unmarked or blank rectangles and indicate data of potential interest for further query evaluation. Storage regions 345 depict a per column level of granularity in a column store that may be evaluated on the per column basis (e.g., the data in storage regions 340 are depicted across five columns).

Each storage region 345 is read at step 350, with the exception that those column values marked as do not read (e.g., those storage region columns marked with a right hash). In one example, when a storage region contains data that is not of interest (e.g., as indicated by left hashing), those unread portions may be filled with "mock" data at step 360. The mock data comprises data that produces the same predicate evaluation results as the actual data. Suitable mock data is determined by using the minimum, maximum or a value between those two values from the range metadata for each storage region to be read. In addition to producing the same predicate evaluation result, mock data may be chosen to compress well (for example by using a constant value per region), or to make predicate evaluation as simple as possible (for example by choosing the shortest string value which lies between the minimum and maximum string values for a range, or by choosing a NULL value as the mock value for a region if the region contains any NULL values at all). The resulting storage regions with mock data embedded therein, are depicted at reference numeral 370. Ultimately, a given predicate is evaluated (that may include plural conditional expressions) using both the actual data and the mock data fillers at step 380.

As described above, in hybrid column store (e.g., a PAX store) the query predicates can be evaluated according to the techniques provided herein on a column by column basis (i.e., in lieu of reading an entire storage region because a single row satisfies a given query). In general, a basic database query includes a single condition for evaluation, e.g., "does the database customer table contain the surname Smith?" (i.e., table=customer and surname=Smith). Intuitively, queries may become increasingly complex. For example, does "Smith" have a spouse nee "Jones?" which may require a search of a table other than the customer table. Accordingly, during query planning and evaluation any given query may have predicates that include numerous conditional expressions and may form nested or treed evaluation that may be referred to as a B-tree or expression evaluation tree.

During query planning, it may be assumed that one or more tables are to be scanned. A table scan includes predicates on the rows of the table. These predicates may include "base restricts" (i.e., computations involving constant values and the columns of the table). Alternatively, the predicate may include join restricts (i.e., predicates derived from exists joins and inner joins). In either case, the base or join restricts may be evaluated first using region metadata for each storage region of the table (i.e., as a precursor to further evaluation).

A restrict expression may be represented as a Boolean expression tree, with the leaves as predicates: order comparisons, equality comparisons, and "in set" and "not in set" operations against sets of values representing the second table for an exists join or an inner join. An example plural predicate evaluation using a join technique is further described in connection with FIG. 5, below.

Null semantics (i.e., values known not to exist is a database object) may be dealt with by applying an "is null" flag as a separate column, and including only non-null values in the bounds for a column. One simple way to handle NULL values is to treat the "is null" condition as a separate Boolean column stored either alongside each column or as a separate column. In some implementations, not every column allows NULL values. For columns which are declared to allow NULL values, predicates can be re-written to explicitly handle the NULL values. For example, the predicate x=3 where x is a null-able column may be re-written as (x-is-null=false and x=3). According to this technique store range metadata may also be stored for the x-is-null column, with false=0 and true=1, thereby providing a minimum and maximum value for each storage region.

Figure 4:
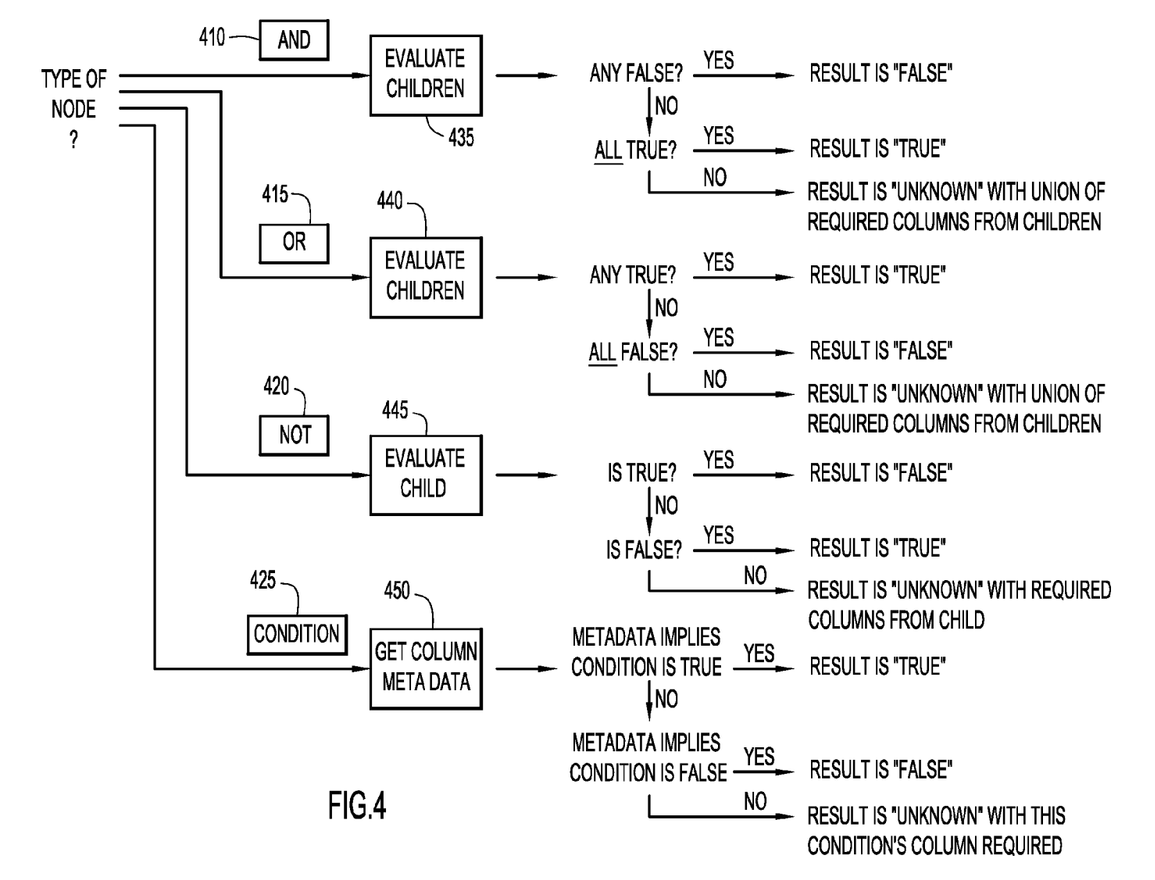
FIG. 4 is a node evaluation diagram illustrating a manner in which conditional expressions of query predicates are evaluated using metadata according to an embodiment of the present invention.

FIG. 4 illustrates an evaluation of an expression (one or more predicate conditions) for each region, with the result being either true, false, or "do not know, and here are the indicted columns required in order to know." For a leaf predicate example, the answer may be either true, false, or "do not know, and column "A" is required." In some examples, the predicate evaluation results in an actual known value of either true or false. The known condition is included in the truth tables below. This concept may be extended to support predicates comparing two columns, which could produce do not know result that requires two columns "A" and "B" to complete the evaluation.

By way of example, a truth table for combining two predicate condition evaluation results with an AND as a Boolean conjunction may be expressed as:

known AND known = the Boolean result (i.e., the answer to the AND condition is the Boolean result when each predicate evaluation is known);
true AND do not know = do not know, return the same set of columns as the "do not know" child;
false AND do not know = false; and
do not know AND do not know = do not know, union of two sets of columns.

Similarly, the truth table for combining two predicate condition results with a Boolean OR is:

known OR known = Boolean result (i.e., a result of true OR true, false OR false, true OR false);
true OR do not know = true;
false OR don't know = do not know, return same set of columns as the "don't know" child; or
do not know OR do not know = do not know, and return the union of two sets of columns.

And the truth table for NOT is:

NOT true = false
NOT false = true
NOT do not know = do not know, return the same set of columns as child.

The truth tables described above provide a convenient mechanism for evaluating query predicate conditional expression results in a hybrid column store. Note in particular, e.g., the effect of a "false AND do not know" condition is equal to false. That is, knowledge about one column (e.g., the column producing a false) allows the DBMS (e.g., via query module 16) to avoid reading other columns involved in the predicate (i.e., once a false is obtained on one side of a binary predicate condition, evaluation of any other query elements may be ignored), thereby reducing I/O and other processing costs. Additional details of a tri-state predicate evaluation process is further described in connection with FIG. 4.

A state diagram illustrating a manner in which query predicates are evaluated by way of a tri-state evaluation process 330 using metadata according to the techniques described above is illustrated in connection with FIG. 4. Briefly, FIG. 4 provides additional context to the tri-state evaluation of plural node conditions, e.g., as performed at step 330. During the tri-state evaluation 330 one of four node condition states (or node types) may be evaluated for two or more nodes. The plural nodes evaluations are performed using Boolean algebraic results as introduced above to indicate a Boolean node type (e.g., AND, OR or NOT, or conditional result types for evaluation two or more nodes).

A plurality predicates may be evaluated using a Boolean AND operation indicated at reference numeral 410, a Boolean OR operation indicated at reference numeral 415, a Boolean NOT operation indicated at reference numeral 420, or by way of a conditional operation indicated by reference numeral 425. Conditional operations may be provided by way of relational operators (>, <, <=, etc.) between two columns, or between a column and a constant value, or between a column and a set of zero or more values (e.g., an in-list).

Children of an AND node may be evaluated at step 435. The truth table results are described to the right of each node type. If any of the predicates that are ANDed are evaluated false, then the entire evaluation result is false. If all of the predicates that are ANDed are evaluated true, then the entire evaluation result is true. If none of the predicates are evaluated false, but all of the predicates cannot be evaluated as true (i.e., at least one predicate is unknown), then the overall result is unknown and the sets of columns to be read are merged via a union operation. Accordingly, when the evaluation results are true or false, the corresponding column data need not be read for purposes of evaluating this predicate since a true or false result provides a definitive answer to the node evaluation question (i.e., the queried data are present or absent). However, when a predicate condition result is unknown it indicates that insufficient information is available to evaluate the conditional expressions applied to that storage region. An example of how to determine an unknown result is described below.

When a given predicate condition evaluates to a true or a false condition, the column data associated with that condition are not required to be read for that predicate evaluation since the result of the predicate result is a definitive "yes" or "no" answer (i.e., yes the queried data are present in the evaluated column data, or no, the queried data are not present in the evaluated column data). When a result is unknown for a combination of predicate evaluations (or conditional expression portion thereof), the column data for that that portion of an evaluation that is unknown is retrieved from storage in order to come to a definitive yes or no answer based on further scanning of the retrieved data. Thus, the evaluation may be based on metadata or actual data, and when the result is a known, false or true, the column data is not read, but when a result is unknown, only the column data that can be used to come to definitive terms for a given evaluation are read (e.g., when any truth table results in a unknown ("do not know") condition)).

To illustrate, consider two columns A and B, and range map metadata that indicates that values in column A range from 20-30 and that values in column B range from 0-10. If, for example, a predicate condition is defined as A>=20, then the condition result is true since the minimum endpoint has a value of 20 and includes all records have a value of at least 20. Since the result in known to be true, column A is not read from storage. If another predicate is defined as A=40, then the result is false since the value of 40 is outside of the values in the range map for column A. Since the result in known to be false, column A need not be read from storage. If a predicate is defined as A=25, then the evaluation result is unknown since it cannot be concluded with certainty that the value of 25 is in column A without reading and searching column A. Similar predicates may be defined for column B. Predicates for column A and column B may be evaluated as children of an AND node at step 435.

Predicate conditions may be evaluated as children of an OR node at step 440. As indicated in the truth table for the OR node, if any child evaluation is true, then the overall OR node result is true. If all of the predicates that are ORed are evaluated false, then the entire evaluation result is false. Otherwise, at least one predicate is evaluated as unknown (i.e., since there are only three states in a tri-state evaluation with no predicates evaluated as true), and when any predicates condition results are ORed with at least one unknown result the overall result of OR node evaluation is unknown, and the sets of columns to be read are merged via a union operation. The merged columns may need to be read for predicate evaluation.

A NOT node, by definition, has a single child and the predicate condition is evaluated with a Boolean NOT operation at step 445. In this example, the truth table for a NOT node negates the result of the predicate condition. As such, a predicate with a true result is returned as false and a predicate with a false result is returned as true. When the evaluation of the child produces an unknown result, the associated set of columns is still required in order to determine the results of the NOT node.

A node condition (e.g., >, <, <=, etc.) is evaluated based on the given condition and associated column metadata are obtained at step 450. A node condition has no children to evaluate. The truth table for a node condition is based on evaluation of the column metadata. If the metadata implies that the condition is true, a true result is returned. If the metadata implies that the condition is false, a false result is returned. Otherwise, the condition evaluates to unknown, and the associated column or columns from the predicate are considered required for determining this condition's result.

The above description provides a framework for limiting scans of data when it can be determined, e.g., by way of a truth table, which columns of data can be evaluated without being read from storage, thereby saving I/O and other computing resources. As can be appreciated, a query planner (e.g., as part of query module 16 and/or scan module 20) may generate complex queries that may include exist joins, inner joins, merge joins, and the like. The evaluation of a given query may include complex evaluations and may include any number or type of database query designs. Accordingly, actual queries may take on a variety of forms. In order to provide an example, a manner in which evaluation of a query that employs an inner join (e.g., by query module 16 and/or scan module 20) is illustrated in FIG. 5.

Figure 5:
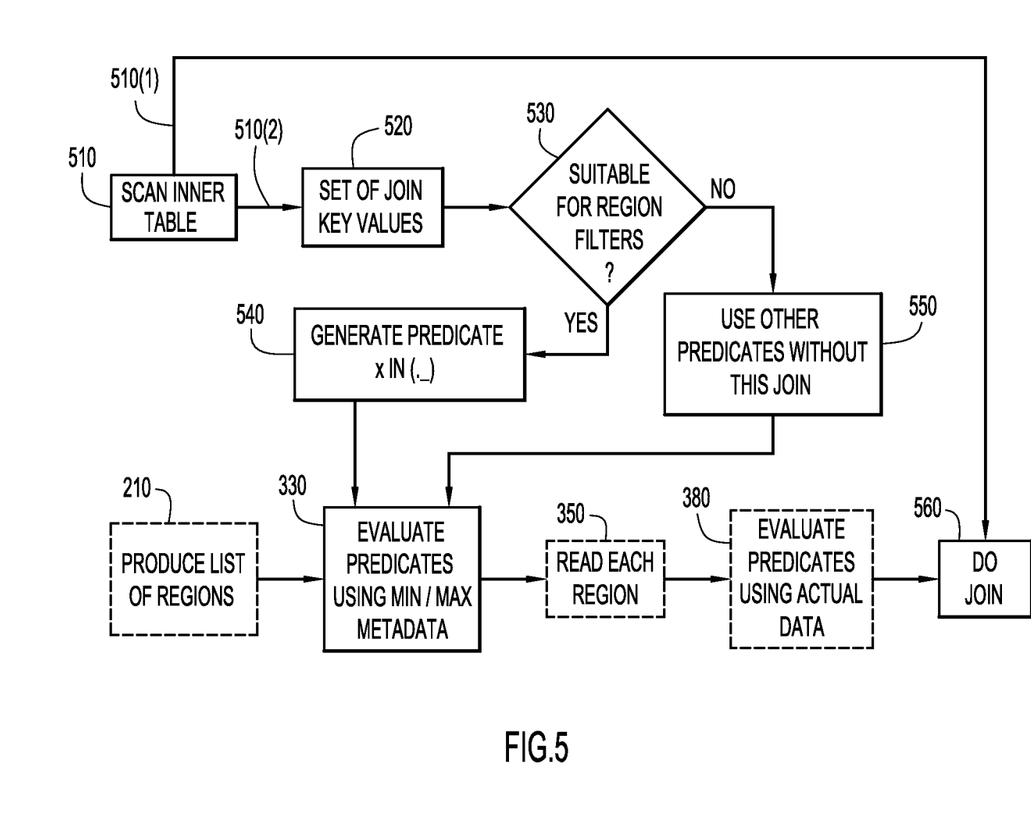
FIG. 5 is a flow diagram illustrating a manner in which query predicates are evaluated when a query predicate is derived from a join condition according to an embodiment of the present invention.

The flow along the bottom of FIG. 5 is representative of the processing with respect to a large table X that is streamed with respect to a smaller table Y as part of the inner join. The inner join, as used herein, joins rows filtered by column from X with rows filtered by column of Y to "join" or merge column data that can be used to evaluate a particular predicate condition (e.g., does table X column A=table Y column A). The upper portion of FIG. 5 depicts operations with respect to the inner table that starts with a scan of the inner table at step 510. The scan of inner table at step 510 produces results which are used in two ways. First, at 510(2), the scan results are considered for use as part of predicate evaluation during scan list construction. If the scan results are suitable for use, for example the number of rows is small enough and the data type is supported, then the scan results are turned into an "In list" condition as part of the predicate. Second, at 510(1), the scan results are used for the actual join with rows which are read.

By way of background, the outer table may be a larger base table that may be a composite of plural tables or include references to subsets of data, e.g., customer data that includes specific purchases or medical data. When queries are processed, combinations of the base table (e.g., the customer base) may be combined with a smaller table (e.g., those customers' purchases for a given location, site, state or date). In order to process a query, the DBMS may employ a query planner or other query processor, as described above. In this regard, DBMS evaluation trees are formed from query predicate conditions and may form using combinations of mathematical, Boolean expressions, relational algebra, etc.

For example, a customer of company X may call a customer service agent with a question about a given transaction. The agent may determine that the customer's name is Smith, that Smith lives in Massachusetts, and purchased an item Y. The query may include predicates of name="Smith," state="Massachusetts" and item="Y." In this example, the query planner may scan the customer table for name and state that may return unique customer identifiers (cids) that may be used as a key to another table. The cids may be used to scan a purchase table for item Y. The query planner may thereby perform a database join operation between the customer table and the purchase table as blocks of data from each table are streamed through that available memory. In most instances, a join operation will narrow the result set, but when results are not mutually exclusive, the result set may be larger than the individual results from either the inner table or the outer table.

Once the join keys values from the inner table have been obtained at step 520, it is determined whether storage regions indicated by the join key values from the inner table are suitable for filtering at step 530. Certain data may not be suitable for filtering (e.g., by applying an additional predicate derived by query module 16 and/or scan module 20). For example, variable length string data may not easily be defined by (or fit into) a range map that can provide string comparisons in a predicate, or in other instances, range map data may not be available for use in a predicate. When the storage region data are not suitable for filtering, other predicate conditions remaining outside of the current join operation may be used at step 550. When the storage region data are suitable for filtering, further predicates may be generated to facilitate the current join operation at step 540. For example, when searching for a Smith's purchase of item Y, it may improve the join by generating the predicate: is a date D found in a date column indicated by a given join key?, which may narrow the ultimate query result set.

Once a set of predicates are obtained (e.g., at steps 540 or 550, and any suitable original query predicates), the predicates may be evaluated using metadata (e.g., range maps with min/max range values) using a per-column tri-state evaluation criteria at step 330, as described above. The tri-state evaluation 330 identifies those columns in each storage region that need to be read at step 350. In order to facilitate predicate evaluation using actual data, the DBMS (e.g., via query module 16 and/or scan module 20) may insert mock data that can be scanned without adding to the scan complexity. Predicate evaluation using actual and mock data is performed at step 380. The inner join is performed at step 560 to join the evaluated data.

As described above, the inner join joins column data from the outer table and the inner table and is performed relative a given portion of a query (e.g., at least one predicate), and may include additional criteria as determined by the query planner.

It will be appreciated that the embodiments described above and illustrated in the drawings represent only a few of the many ways of implementing limiting scans of loosely ordered or grouped relations in a database.

The environment of the present invention embodiments may include any number of computer or other processing systems (e.g., client or end-user systems, host systems, data servers, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, query module, scan module, etc.). These systems may include any types of monitors and input devices (e.g., keyboard, mouse, voice recognition, etc.) to enter and/or view information.

It is to be understood that the software (e.g., query module, scan module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client, data servers, and host systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., query module, scan module, etc.) may be available on a non-transitory computer useable medium (e.g., magnetic or optical mediums, magneto-optic, mediums, floppy diskettes, CD-ROM, DVD, memory devices, etc.) of a stationary or portable program product apparatus or device for use on stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information (e.g., data, query results, metadata, etc.). The database system may be implemented by any number of any conventional or other databases, data stores or storage structures (e.g., files, databases, data structures or tables, data or other repositories, etc.) to store information (e.g., data, query statistics, etc.). The database system may be included within or coupled to the server, data servers and/or client systems. The database systems and/or storage structures may be remote from or local to the computer or other processing systems, and may store any desired data (e.g., data, query results, metadata, etc.). Further, the various tables (e.g., data, query results, metadata, etc.) may be implemented by any conventional or other data structures (e.g., files, arrays, lists, stacks, queues, etc.) to store information, and may be stored in any desired storage unit (e.g., database, data or other repositories, etc.).

The present invention embodiments may employ any number of any type of user interface (e.g., Graphical User Interface (GUI), command-line, prompt, etc.) for obtaining or providing information (e.g., databases, query statistics, etc.), where the interface may include any information arranged in any fashion. The interface may include any number of any types of input or actuation mechanisms (e.g., buttons, icons, fields, boxes, links, etc.) disposed at any locations to enter display information and initiate desired actions via any suitable input devices (e.g., mouse, keyboard, etc.). The interface screens may include any suitable actuators (e.g., links, tabs, etc.) to navigate between the screens in any fashion.

Any reports generated using the technique described herein may include any information arranged in any fashion, and may be configurable based on rules or other criteria to provide desired information to a user (e.g., query statistics, etc.). The query statistics may provide an indication of query efficiency (e.g., a quantity of data that did not have to be processed). Based on the query statistics, the techniques may be modified or improved, and may be adapted for the types of data that may be processed.

The present invention embodiments are not limited to the specific tasks or algorithms described above, but may be utilized for limiting scans for data associated with any type of database, memory or any other storage structure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Small-talk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of accessing data within a database object based on a query with a predicate including a plurality of conditional expressions, wherein an element of the database object is stored among a plurality of different storage regions with each storage region being associated with first and second range values indicating a value range for element values within that storage region, the method comprising:

applying each conditional expression of the query predicate to at least one of the first and second range values for each of the storage regions to produce evaluation results of that conditional expression for the storage regions, wherein each storage region comprises units of column data, and applying each conditional expression further comprises:
inserting mock data into units of column data of a storage region that are determined not to be scanned based on application of that conditional expression;

combining the evaluation result of each conditional expression for a corresponding storage region to produce aggregated results for each of the storage regions, wherein the aggregated result for a corresponding storage region indicates at least one of a presence of data satisfying the conditional expressions within that storage region, an absence of data satisfying the conditional expressions within that storage region, and insufficient information to determine the presence of data satisfying the conditional expressions within that storage region, and wherein the aggregated result for at least one storage region indicates insufficient information;

providing information to evaluate one or more conditional expressions for a storage region in response to the aggregated result for that storage region indicating insufficient information, wherein the provided information indicates one or more columns within that storage region; and scanning one or more corresponding individual storage regions based on the aggregated results for those storage regions and the provided information.

2. The method of claim 1, wherein said scanning one or more corresponding individual storage regions includes:

omitting one or more corresponding individual storage regions from scanning in response to the aggregated result for those storage regions indicating one of the presence of data satisfying the conditional expressions and the absence of data satisfying the conditional expressions.

3. The method of claim 1, wherein the database object includes a database table, and the information provided includes database table columns providing the information to evaluate the conditional expressions.

4. The method of claim 1, wherein applying each conditional expression further comprises:

determining a set of storage regions to be scanned based on application of that conditional expression.

5. The method of claim 4, wherein combining the evaluation result further comprises:

combining the determined sets of storage regions for the conditional expressions in accordance with the query predicate to determine a resulting set of storage regions to be scanned.

6. The method of claim 4, wherein applying each conditional expression further comprises:

determining units of column data within a storage region to be scanned based on application of that conditional expression.

7. The method of claim 1, further comprising:

determining whether a storage region from two or more database objects should be joined in order to evaluate the predicate;

in response to determining that the storage region from the two or more database objects should be joined, joining the storage region from each of the two or more database objects; and evaluating the predicate based on the content of the joined storage regions.

* * * * *